Jan. 24, 1950 — M. H. TESKEY — 2,495,394

FROZEN MEAT CUTTER KNIFE GUIDING ASSEMBLY

Filed July 19, 1948

Inventor:
MARK. H. TESKEY.

By Fetherstonhaugh & Co
his Atty's.

Patented Jan. 24, 1950

2,495,394

UNITED STATES PATENT OFFICE 2,495,394

FROZEN MEAT CUTTER KNIFE GUIDING ASSEMBLY

Mark H. Teskey, Killarney, Manitoba, Canada

Application July 19, 1948, Serial No. 39,541
In Canada August 20, 1947

1 Claim. (Cl. 146—159)

My invention relates to a conspicuously simple knife-guiding assembly for use in association with a machine for expeditiously slicing up large quantities of frozen meat for consumption in fur farms and the like.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which—

In the drawings like characters of reference indicate corresponding parts in the different figures.

My meat cutting machine consists of a rectangular platform 1 onto which slabs of frozen meat may be placed, the said platform being suitably supported as by the pairs of legs 2 and 3 suitably braced by the cross members 4 and 5.

Figure 1:
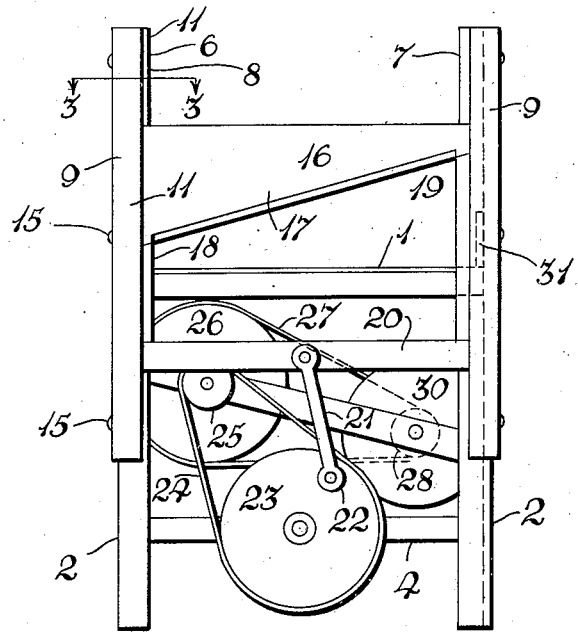
Figure 1 is a front elevation of my meat cutter.
Figure 3:
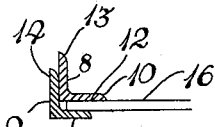
Figure 3 is a cross-sectional detail on the line 3—3 of Figure 1.
Figure 2:
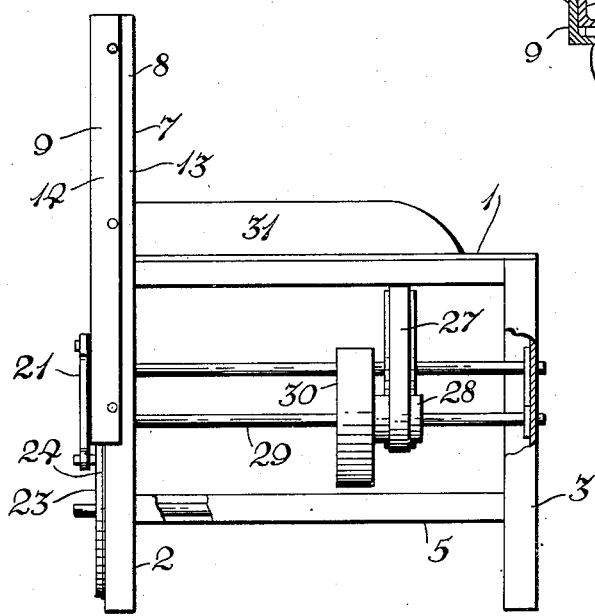
Figure 2 is a side elevation of my meat cutter.

Secured at two adjacent corners of platform 1 are guide assemblies 6 and 7, these assemblies extending above platform 1 and each consisting of a pair of angle bars 8 and 9 in what I designate as nested relationship best depicted in the accompanying Figure 3 wherein it will be seen that the two parallel flanges 10 and 11 of each assembly are spaced to provide a guideway 12 while the flanges 13 and 14 are secured in contactual lapping relationship and either spot-welded at intervals or connected by means of the rivets 15.

The angle-bars 8 of my guiding assemblies may be continuous and integral with the pair of legs 2, and within the guideways 12 is positioned for vertical reciprocating movement, a cutting-frame assembly collectively designated 16. This cutting-frame assembly in detail comprises a vertically disposed and diagonally bladed cleaver 17 from the ends whereof depend vertical side rails 18 and 19 spanned at the lower ends thereof by the horizontal rail 20.

Pivotally attached at the centre point of rail 20 is a connecting rod 21, the opposite end whereof is eccentrically connected at 22 to flywheel 23. Flywheel 23 is mechanically connected by belt 24 to pulley 25 mounted co-axially with the large pulley 26 which in turn is connected by belt 27 to pulley 28. Pulley 28 is mounted co-axially on shaft 29 with the drive pulley 30 connected to a source-of-power, and by means of the foregoing train of power transmission, I am able to obtain a reciprocating action for my cutting-frame assembly 16 of sufficient energy for the purpose specified.

Upon one edge of platform 1 I mount a vertical retaining panel 31 to assist in aligning and manipulating slabs of frozen meat to the cleaver 17, and in operation it is to be understood that cleaver 17 moves vertically in guideways 12 across the produced plane of platform 1 and in shearing relationship to the edge 32 thereof which is adjacent and parallel to the said cleaver.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

A frozen meat cutter for fur farms and the like comprising in combination a substantially rectangular platform, vertical guiding assemblies at each of two adjacent corners of said platform extending thereabove, said guiding assemblies each consisting of a pair of angle bars in nested relationship such that two of the parallel flanges are spaced to provide a guideway and the other two overlapping flanges mutually secured and in inter-surface contact, an open-centred cutting-frame assembly mounted for movement in said guideway, said frame embodying a vertically diagonally bladed cleaver spanning said guide members, vertical side rails extending downwardly from the ends of said cleaver, and a horizontal spanning-rail secured to the lower ends of said side-rails, a connecting rod attached to said spanning-rail to impart vertical reciprocating movement to said frame, across the produced plane of said platform in shearing relationship to the adjacent edge thereof, a flywheel below said platform to which said connecting rod is eccentrically attached, and means for operating said flywheel.

MARK H. TESKEY.

REFERENCES CITED

The following references are of record in the file of this patent:

UNITED STATES PATENTS

| Number | Name | Date |
| --- | --- | --- |
| 40,705 | Newlin | Nov. 24, 1863 |
| 184,247 | Landstrom | Nov. 14, 1876 |
| 465,891 | Schmidt | Dec. 29, 1891 |